(12) United States Patent
Tissot et al.

(10) Patent No.: US 10,502,488 B2
(45) Date of Patent: Dec. 10, 2019

(54) GAS QUENCHING CELL

(71) Applicant: ECM TECHNOLOGIES, Grenoble (FR)

(72) Inventors: Gérard Tissot, Saint-nazaire-les-eymes (FR); Francis Pelissier, Grenoble (FR)

(73) Assignee: ECM TECHNOLOGIES, Grenoble (FR)

( * ) Notice: Subject to any disclaimer, the term of this patent is extended or adjusted under 35 U.S.C. 154(b) by 205 days.

(21) Appl. No.: 14/762,405

(22) PCT Filed: Jan. 22, 2014

(86) PCT No.: PCT/FR2014/050122
§ 371 (c)(1),
(2) Date: Jul. 21, 2015

(87) PCT Pub. No.: WO2014/114881
PCT Pub. Date: Jul. 31, 2014

(65) Prior Publication Data
US 2015/0354898 A1 Dec. 10, 2015

(30) Foreign Application Priority Data
Jan. 23, 2013 (FR) ..................................... 13 50575

(51) Int. Cl.
| F27D 7/04 | (2006.01) |
| H02K 21/12 | (2006.01) |
| H02K 7/14 | (2006.01) |
| C21D 1/767 | (2006.01) |
| C21D 9/00 | (2006.01) |
| F27B 3/24 | (2006.01) |

(52) U.S. Cl.
CPC ............... F27D 7/04 (2013.01); C21D 1/767 (2013.01); C21D 9/0062 (2013.01); F27B 3/24 (2013.01); H02K 7/14 (2013.01); H02K 21/12 (2013.01)

(58) Field of Classification Search
CPC ......... C21D 1/767; C21D 9/0062; F27B 3/24; F27D 7/04; H02K 21/12; H02K 7/14
USPC .................................. 266/46, 251, 259, 250
See application file for complete search history.

(56) References Cited

U.S. PATENT DOCUMENTS

| 3,907,510 A * | 9/1975 | Collins ................... C01B 17/54 261/94 |
| 4,653,732 A | 3/1987 | Wunning et al. |
| 5,334,899 A * | 8/1994 | Skybyk ................ H02K 1/2793 310/114 |
| 6,216,358 B1 * | 4/2001 | Pelisser .................. C21D 1/613 266/249 |

(Continued)

FOREIGN PATENT DOCUMENTS

CN  1377978 A  11/2002

OTHER PUBLICATIONS

International Search Report for PCT/FR2014/050122, dated Apr. 16, 2014, 2 pages.

(Continued)

*Primary Examiner* — Jessee R Roe
*Assistant Examiner* — Michael Aboagye
(74) *Attorney, Agent, or Firm* — Moreno IP Law LLC

(57) ABSTRACT

A quenching cell including an enclosure containing at least one element for stirring a quenching gas at a pressure greater than 0.4 MPa and a synchronous electric motor capable of rotating the stirring element.

11 Claims, 5 Drawing Sheets

(56) References Cited

U.S. PATENT DOCUMENTS

| 6,428,742 B1* | 8/2002 | Lemken | C21D 1/767 |
| | | | 148/209 |
| 2013/0129488 A1* | 5/2013 | Agrawal | F04D 29/057 |
| | | | 415/170.1 |

OTHER PUBLICATIONS

Loeser K et al: "Neue Entwicklungen Auf Dem Gebi Et Der Hochdruck-Gasabschreckung", HTM Haerterei Technische Mitteilungen: Zeitschri Ft Fuer Werkstoffe, Waermebehandlung Und Fertigung, Carl Hanser Verlag, Munch EN, DE, vol. 58, No. 2, 2003, pp. 74-82.

English Translation of the Written Opinion of the International Searching Authority filed in PCT/FR2014/050122; 5 pages.

* cited by examiner

GAS QUENCHING CELL

The present patent application claims the priority benefit of French patent application FR13/50575 which is herein incorporated by reference.

BACKGROUND

Embodiments of the present invention relate to a gas quenching cell for parts, particularly made of steel.

DISCUSSION OF THE RELATED ART

Gas quenching methods for steel parts have many advantages over liquid quenching methods, and especially the fact that the treated parts come out dry and clean.

The gas quenching of steel parts which have been previously submitted to a thermal treatment (for example, heating before quenching) or to a thermochemical treatment (cementation, carbonitriding . . . ) is generally performed with a pressurized gas, generally from 4 to 20 bars. The quenching gas is, for example, nitrogen, argon, helium, carbon dioxide, hydrogen, or a mixture of these gases.

A quenching operation comprises rapidly cooling steel parts which are generally at temperatures in the range from 750° C. to 1,000° C., or even 1,200° C. for stainless steels. At such temperatures, steel is essentially in the form of austenite which is only stable at high temperatures. A quenching operation enables, by a fast cooling, to obtain a transformation of austenite into martensite, which has higher hardness properties.

A quenching cell generally comprises at least one motor, generally of electric type, rotating a stirring element, for example, a propeller or a centrifugal turbine, capable of circulating the quenching gas in the quenching cell at the level of the parts to be cooled and of the heat exchangers enabling to cool the quenching gas. Conventionally, asynchronous electric motors arranged outside of the enclosure of the quenching cell are used. The drive shaft of each asynchronous electric motor is connected to the stirring element through the enclosure wall.

The electric motors for driving the stirring elements may be arranged at the top of the enclosure. In this case, the floor space occupied by the quenching cell is essentially set by the dimensions of the enclosure of the quenching cell.

However, in certain conditions, particularly along the desired quenching gas flow direction at the level of the parts to be treated, it may be necessary to arrange the electric motors for driving the stirring elements outside of the quenching cell enclosure on either side of the enclosure substantially in the median horizontal plane of the enclosure.

The arranging of the asynchronous electric motors on the sides of the enclosure increases the floor space occupied by the quenching cell. The total bulk of the quenching cell comprises, in addition to the occupied floor space, an area around the quenching cell which should be left free to provide access to the quenching cell, particularly for maintenance operations, for example, the removal and the installation of electric motors. Thereby, the total bulk of a quenching cell having its electric motors laterally arranged on either side of the quenching cell enclosure is increased with respect to the same quenching cell for which the electric motors are arranged at the top of the quenching cell enclosure.

There thus is a need to decrease the total bulk of a gas quenching cell for which at least one electric motor for driving a stirring element is arranged on the side of the quenching cell enclosure.

SUMMARY

An object of an embodiment of the invention is to at least partly overcome the disadvantages of previously-described quenching cells.

According to another object of an embodiment of the present invention, the quenching cell has a decreased total bulk, and particularly a decreased occupied floor space.

According to another object of an embodiment of the present invention, the maintenance of the electric motors for driving the stirring elements of the quenching cell is eased.

Thus, an embodiment provides a quenching cell comprising an enclosure containing at least one element for stirring a quenching gas at a pressure greater than 0.4 MPa and a synchronous electric motor capable of rotating the stirring element.

According to an embodiment, the synchronous electric motor is tight with respect to the outside of the quenching cell, for a pressure in the synchronous electric motor in the range from 10 Pa to 2,500,000 Pa.

According to an embodiment, the synchronous electric motor comprises at least two steel flanges delimiting a volume containing at least one stator, said flanges resisting the pressure in the synchronous electric motor.

According to an embodiment, the cell comprises a circuit for supplying the enclosure and the synchronous electric motor with quenching gas.

According to an embodiment, the supply circuit is capable of maintaining, during a quenching operation, the pressure in the synchronous electric motor higher than the pressure in the enclosure.

According to an embodiment, the pressure in the synchronous electric motor is greater by at least 500 Pa than the pressure in the enclosure.

According to an embodiment, the supply circuit is capable of maintaining, during a quenching operation, the pressure in the synchronous electric motor equal to the pressure in the enclosure.

According to an embodiment, the cell comprises a sensor of the pressure in the synchronous electric motor and/or a sensor of the difference between the pressure in the synchronous electric motor and the pressure in the enclosure.

According to an embodiment, the supply circuit is capable of controlling the pressure in the synchronous electric motor with the pressure in the enclosure.

According to an embodiment, the synchronous electric motor is located outside of the enclosure and comprises a drive shaft connected to the stirring element through the enclosure.

According to an embodiment, the synchronous electric motor is a radial flow synchronous electric motor.

According to an embodiment, the synchronous electric motor comprises one rotor and two stators located on either side of the rotor.

According to an embodiment, the synchronous electric motor comprises two flanges and one rotor located between the two flanges and connected to a drive shaft, each flange comprising a first through opening for the passage of the drive shaft and second through openings around the first opening.

According to an embodiment, at least one of the second openings is connected to a pipe for supplying gas to the motor when the quenching cell is in operation.

BRIEF DESCRIPTION OF THE DRAWINGS

The foregoing and other features and advantages will be discussed in detail in the following non-limiting description of specific embodiments in connection with the accompanying drawings, among which.

For clarity, the same elements have been designated with the same reference numerals in the different drawings.

DETAILED DESCRIPTION

In the following description, expressions "substantially", "approximately", "about", and "in the order of" mean "to within 10%". Further, only those elements which are necessary to the understanding of the present invention are shown. In particular, the quenching gas cooling system in the quenching cell is not shown in detail.

Figure 1:
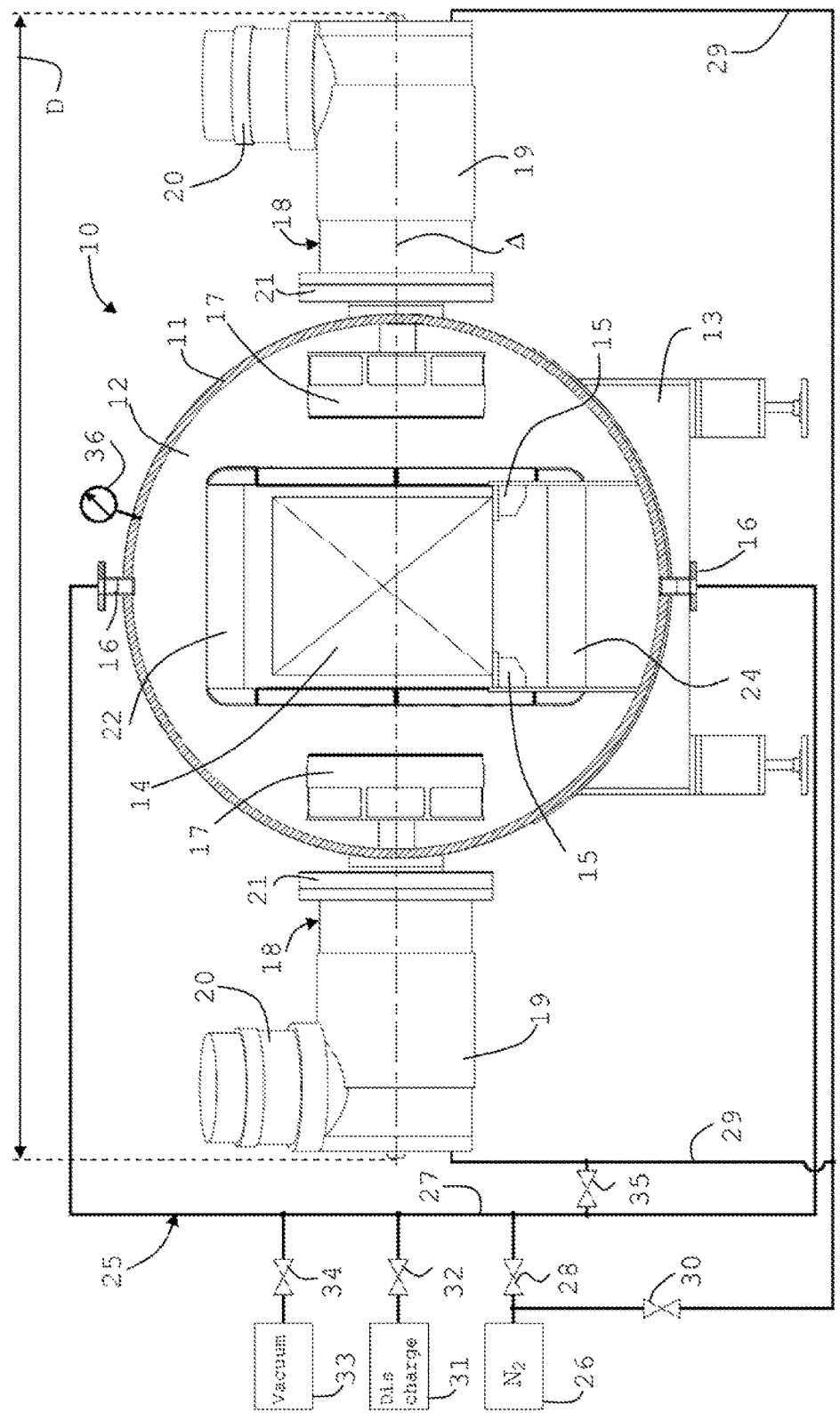
FIG. 1 is a lateral view, with a partial cross-section, of an example of a quenching cell according to an embodiment of the invention.

FIG. 1 shows an example of a gas quenching cell 10. Quenching cell 10 comprises an enclosure 11 delimiting internal volume 12 of quenching cell 10. Enclosure 11 may be a cylindrical enclosure having a horizontal axis. As a variation, the axis of enclosure 11 may be vertical. Enclosure 11 rests on a support 13. A load, comprising parts to be treated 14, schematically shown in FIG. 1, may be introduced into enclosure 11 on rails 15.

A quenching gas may be introduced into enclosure 11 via openings 16 and be circulated in enclosure 11 by stirring elements 17. The quenching gas for example is nitrogen, argon, helium, carbon dioxide, hydrogen, or a mixture of these gases. During a quenching operation, the pressure in quenching cell 10 may be maintained between 4 bars (0.4 MPa) and 25 bars (2.5 MPa) and is preferably greater than or equal to 10 bars (1 MPa), more preferably greater than 15 bars (1.5 MPa). Stirring elements 17 for example comprise centrifugal or helico-centrifugal propellers. As an example, two stirring elements 17 are shown in FIG. 1 in enclosure 11 on each side of load 14. Stirring elements 17 may set the quenching gas to motion so that it flows through load 14 along the vertical direction.

During a quenching operation, each stirring element 17 is rotated around an axis Δ by an electric motor 18. Axis A may be common to the two stirring elements 17. As an example, axis Δ is horizontal and is located substantially in the horizontal median plane of enclosure 11. Electric motors 18 generally are asynchronous electric motors. FIG. 1 shows, for each asynchronous electric motor 18, a carter 19 containing the stator and the rotor of the electric motor, having a generally cylindrical shape of axis Δ, and a carter 20, of generally cylindrical shape, which prolongs carter 19 at its end opposite to enclosure 11 substantially along a direction perpendicular to axis Δ and containing the asynchronous electric motor control power electronic circuits. For each asynchronous electric motor, carter 19 is attached to a coupling device 21, itself attached, for example, by soldering, to enclosure 11.

Quenching cell 10 further comprises cooling systems 22, 24 for cooling the quenching gas. As an example, a cooling system 22 is arranged in enclosure 11 above load 14 and a cooling system 24 is arranged in enclosure 11 under load 14. Quenching cell 10 may comprise a system, not shown, for imposing the gas flow direction through load 14, for example from bottom to top or from top to bottom.

A quenching gas supply circuit 25 comprises a source 26 of the quenching gas connected to openings 16 by pipes 27. At least one controllable valve 28 is provided on pipes 27. When valve 28 is open, quenching gas is delivered into internal volume 12 of the quenching cell. When valve 28 is closed, the supply of internal volume 12 with quenching gas is interrupted. Source 26 of the quenching gas is further connected to motors 18 by pipes 29. At least one controllable valve 30 is provided on pipes 29. When valve 30 is open, quenching gas is delivered into the internal volume of motors 18. When valve 30 is closed, the supply of the internal volume of motors 18 with quenching gas is interrupted.

Supply circuit 25 comprises a quenching gas discharge system 31 connected to pipes 27 by a controllable valve 32. Supply circuit 25 further comprises a vacuuming system 33, connected to pipes 27 by a controllable valve 34. Pipes 29 for supplying the motors are connected to pipes 27 for supplying internal volume 12 of the quenching cell via a controllable valve 35. Supply circuit 25 comprises a sensor 36 of the pressure in internal volume 12 of quenching cell 10.

During an operating cycle of the quenching cell, the quenching gas present in the cell is discharged by discharge system 31, after which vacuum is created in quenching cell 10 by system 33. Quenching gas is then injected into asynchronous motors 18 and into the quenching cell. The quenching operation is then carried out, the pressure in asynchronous motors 18 being substantially equal to the pressure in internal volume 12 of quenching cell 10.

Maximum lateral floor space D occupied by quenching cell 10 corresponds to the sum of the diameter of enclosure 11, of the axial length of each coupling device 21, and of the axial length of each asynchronous electric motor 18.

As an example, for a quenching cell having a 1.8-m diameter and having an internal volume 12 from 3 to 4 m³, motors 18 should deliver a power greater than 200 kW, particularly when the quenching gas is nitrogen. Each asynchronous electric motor 18 generally is a radial flow motor. The axial length of each asynchronous electric motor 18 may be in the order of 1 m. Thereby, the maximum lateral bulk D at the bottom of quenching cell 10 may reach 5 m, taking into account a 50-cm pathway for accessing each motor 18.

It is further generally necessary to provide, for each electric motor 18, an additional area in the order of 50 cm, particularly for maintenance operations, for example, the deposition and the replacing of each electric motor 18. Thereby, the total maximum lateral bulk of quenching cell 10, including the access areas, may reach 6 m. The dimensions of the premises where quenching cell 10 is arranged should thus be adapted to the total lateral bulk of quenching cell 10, which increases the costs associated with the use of quenching cell 10.

Figure 2:
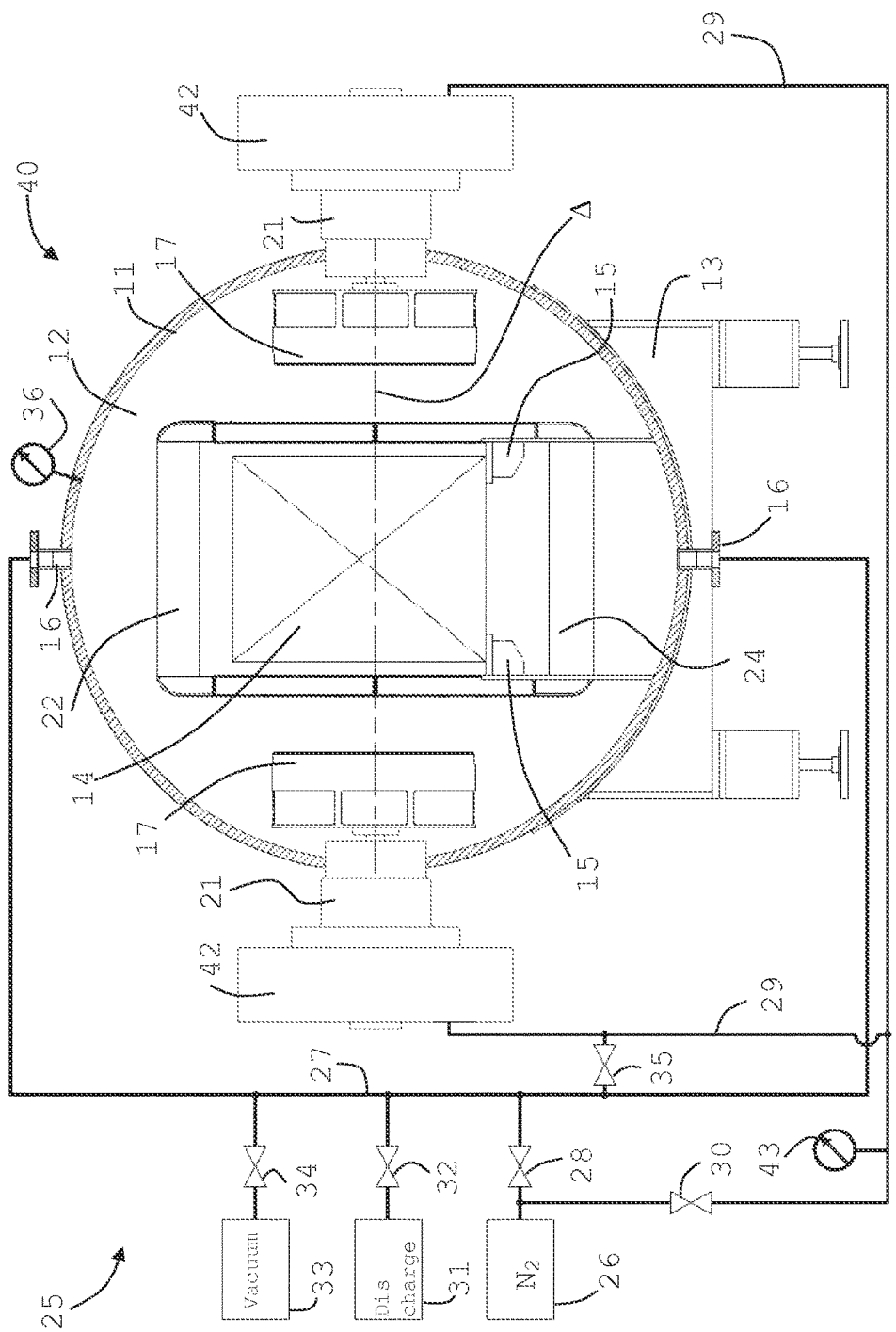
FIG. 2 is a view similar to FIG. 1 of a quenching cell according to an embodiment of the invention.

FIG. 2 shows an embodiment according to the invention of a gas quenching cell 40.

Quenching cell 40 comprises all the elements of quenching cell 10 shown in FIG. 1, with the difference that each asynchronous electric motor 18 is replaced with a synchronous electric motor 42, preferably an axial flow synchronous electric motor.

In the present embodiment, the vacuum and pressure behavior of each synchronous motor 42 is ensured by the flanges of motor 42.

According to an embodiment, each synchronous motor 42 is a radial flow synchronous electric motor, preferably a synchronous electric motor with a single rotor arranged between two stators.

Quenching cell 40 further comprises a sensor 43 of the pressure in the internal volume of synchronous motors 42. Pressure sensor 43 may be arranged on pipes for supplying gas to synchronous motors 42.

Each synchronous electric motor 42 is tight with respect to the external environment of quenching cell 40, at least when the pressure in each motor 42 is in the range from 0.1 mbar (10 Pa), which substantially corresponds to an industrial vacuum or soft vacuum, to 25 bars (2.5 MPa).

During a quenching operation, the pressure in the internal volume of synchronous motors 42 is measured by pressure sensor 43 and the pressure in internal volume 12 of quenching cell 40 is measured by pressure sensor 36, and valves 28 and 30 are opened and closed to adjust the pressure in internal volume 12 of quenching cell 40 and the pressure in each synchronous electric motor 42.

According to an embodiment, during a quenching operation, the pressure in the internal volume of motors 42 is maintained strictly greater than the pressure in internal volume 12 of quenching cell 40. The difference between the pressure in the internal volume of synchronous motors 42 and the pressure in internal volume 12 of quenching cell 10 is, for example, greater than or equal to 5 millibars (500 Pa), preferably 100 millibars (0.01 MPa), more preferably 500 millibars (0.05 MPa). As an example, the difference between the pressure in the volume of synchronous motors 42 and the pressure in internal volume 12 of quenching cell 40 is substantially constant.

According to another embodiment, during a quenching operation, the pressure in the internal volume of motors 42 is maintained substantially equal to the pressure in internal volume 12 of quenching cell 40.

The pressure in the internal volume of synchronous motors 42 may be controlled by the pressure in internal volume 12 of quenching cell 40 so that, during a quenching operation, the pressure in the internal volume of synchronous motors 42 is substantially equal to the pressure in internal volume 12 of quenching cell 40 or so that the pressure in the internal volume of synchronous motors 42 is strictly greater than the pressure in internal volume 12 of quenching cell 40.

An example of operating cycle of quenching cell 40 comprises the following successive steps, a soft vacuum being initially present in internal volume 12 of the quenching cell and in the internal volume of synchronous motors 42:

injecting the quenching gas only into synchronous motors 42, for example, to reach a 1-bar pressure in the synchronous motors, and starting synchronous motors 42;

opening the door of enclosure 11, introducing a load 14 into enclosure 11, and closing the door of enclosure 11;

injecting quenching gas into the internal volume of synchronous motors 42 and into internal volume 12 of quenching cell 40 up to the pressure desired in the internal volume of synchronous motors 42 and in internal volume 12 of quenching cell 40;

quenching, during which operation stirring elements 17 circulate the quenching gas at the level of load 14;

discharging the quenching gas present in internal volume 12 of the quenching cell and in the internal volume of synchronous motors 42 until a soft vacuum is obtained in internal volume 12 of the quenching cell and in the internal volume of synchronous motors 42; and opening the door of enclosure 11, transferring load 14 out of the enclosure, and closing the door of enclosure 11.

As an example, the step of discharging the quenching gas from internal volume 12 of the quenching cell and from the internal volume of synchronous motors 42 is obtained by the opening of valves 32 and 35, valves 28, 30, and 34 being closed until a pressure of approximately 1 bar ($10^5$ Pa) is obtained, followed by the opening of valves 34 and 35, valves 28, 30, and 32 being closed to obtain a soft vacuum.

As an example, the step of injecting the quenching gas only into synchronous motors 42 is obtained by the opening of valve 30, valves 28, 32, 34, and 35 being closed.

As a variation, the soft vacuum is not established in synchronous motors 42 for each operating cycle, but only in some of said cycles. In this case, quenching gas may be present in synchronous motors, for example, at a pressure greater than 4 bars, while a soft vacuum is present in internal volume 12 of the quenching cell.

Circuit 25 for supplying enclosure 11 and synchronous electric motors 42 may have a structure different from that shown in FIG. 2. As an example, sensor 43 of the pressure in synchronous electric motors 42 of sensor 36 of the pressure in internal volume 12 of quenching cell 40 is replaced with a sensor capable of measuring the difference between the pressure in synchronous electric motors 42 and the pressure in internal volume 12 of quenching cell 40. According to another example, synchronous electric motors 42 and internal volume 12 of quenching cell 40 are supplied with quenching gas by two different quenching gas supply circuits.

Figure 3:
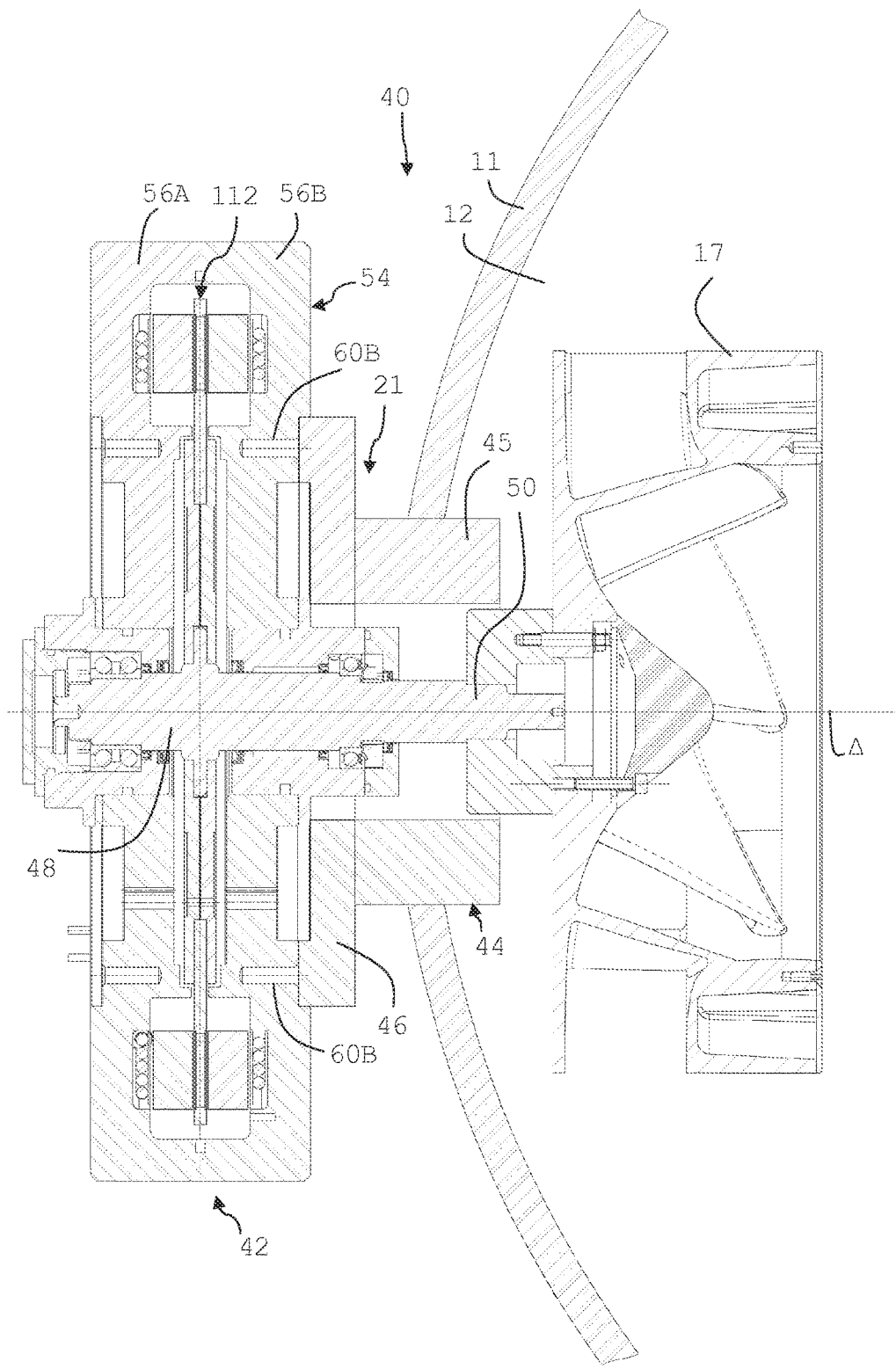
FIG. 3 is a lateral cross-section view of a portion of a quenching cell according to an embodiment of the invention.
Figure 4:
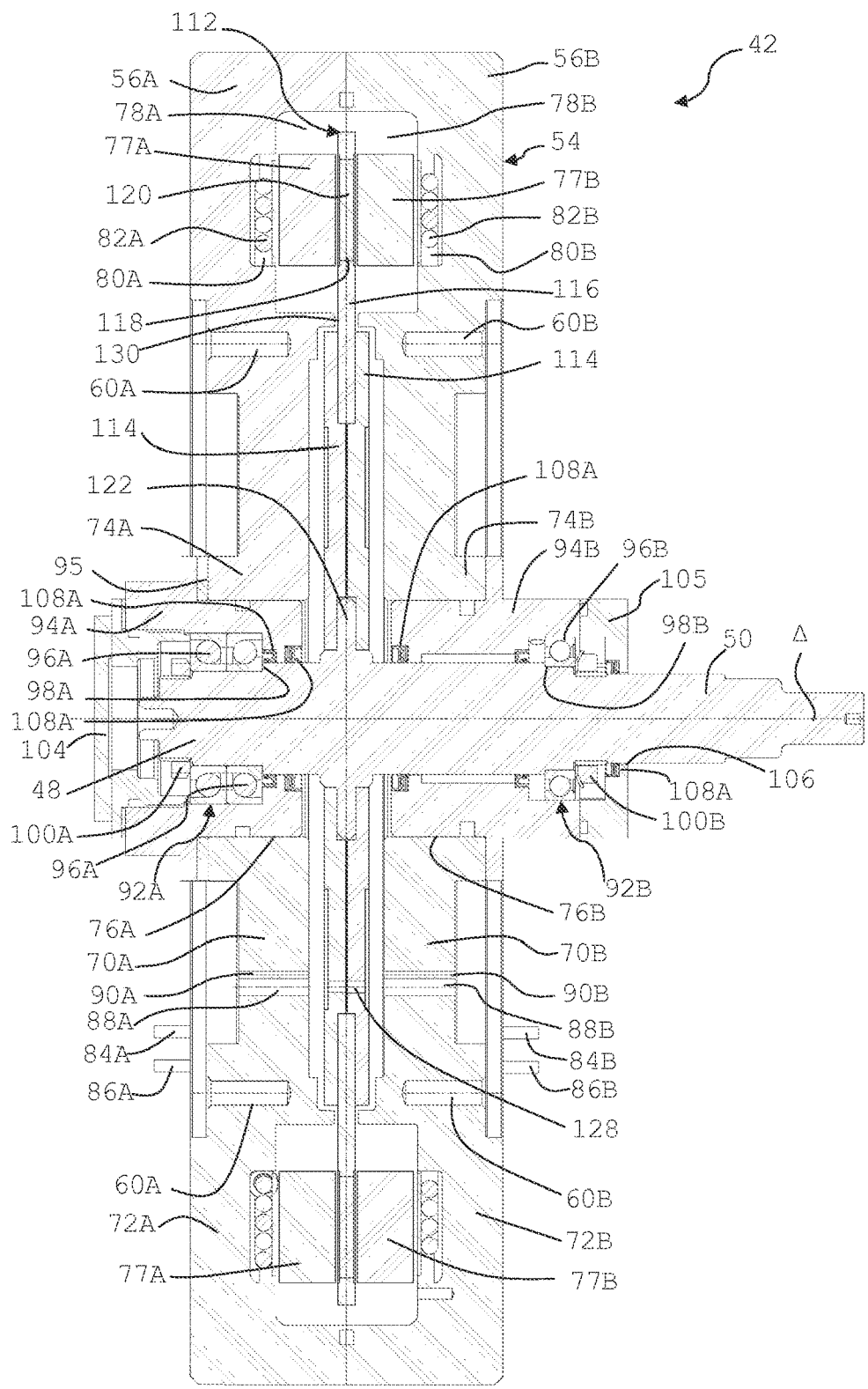
FIGS. 4 and 5 respectively are a cross-section view and a perspective view of the embodiment of the quenching cell of FIG. 3.
Figure 5:
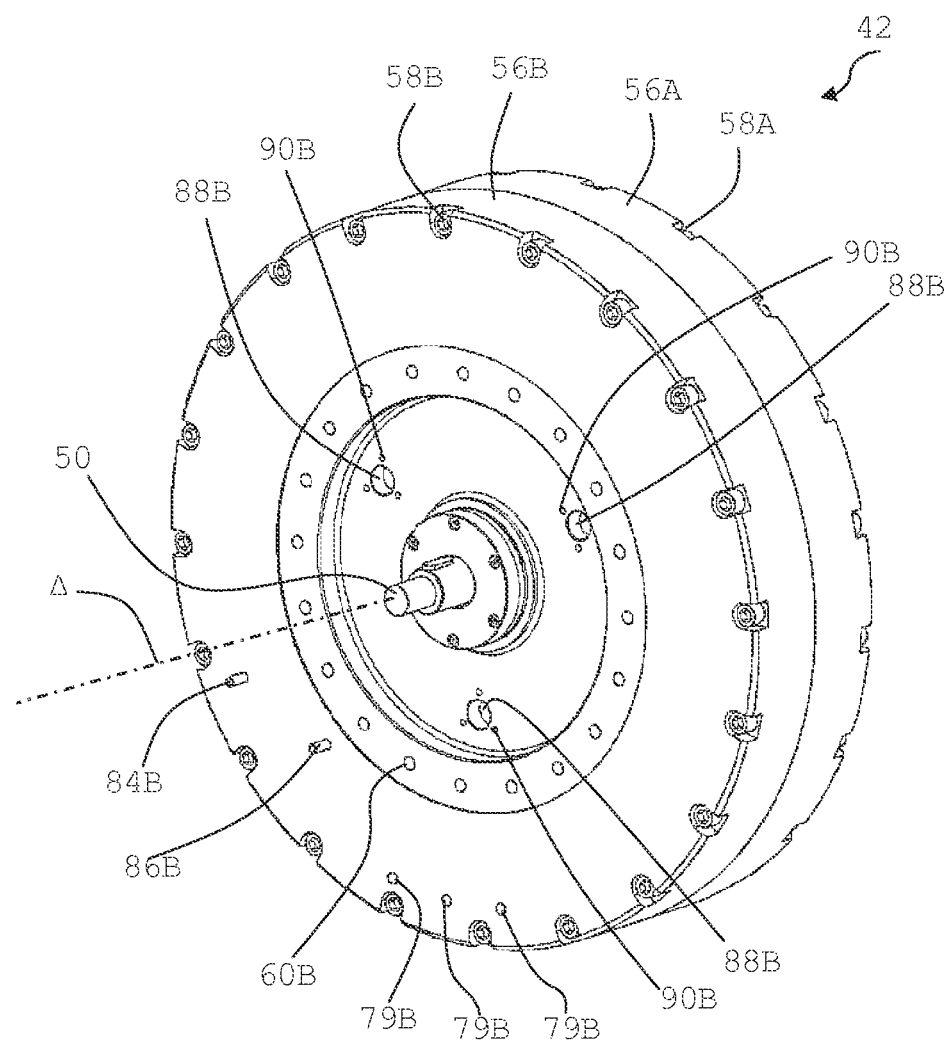

FIG. 3 is a more detailed partial cross-section view of a portion of quenching cell 40 of FIG. 2. FIG. 3 only shows part of enclosure 11, one of stirring elements 17, one of coupling devices 21, and one of synchronous electric motors 42. Further, in FIG. 3, pipe 29 for supplying quenching gas to electric motor 42 is not shown. FIGS. 4 and 5 respectively are a cross-section view and a perspective view of synchronous electric motor 42 of FIG. 3. Coupling device 21 comprises a package 44, formed, for example, of two portions 45, 46 welded to each other. Package 44 is attached to enclosure 11 by welding or by screws. Stirring element 17 is assembled at one end 50 of drive shaft 48 of motor 42.

FIGS. 4 and 5 respectively are a lateral cross-section view and a perspective view of one of electric motors 42.

Motor 42 comprises a carter 54 which is mainly formed of two flanges 56A and 56B. Each flange 56A, 56B has a general structure with a symmetry of revolution around axis Δ. Preferably, flanges 56A and 56B have an identical or substantially identical structure. This advantageously enables to decrease the manufacturing costs of flanges 56A, 56B. In the following description, the references designating identical or similar elements relative to flanges 56A, 56B comprise the same number followed by suffix "A" for an element relative to flange 56A and by suffix "B" for an element relative to flange 56B.

Flanges 56A and 56B are attached to each other by screws 58A, 58B, shown in FIG. 5, and regularly distributed at the periphery of carter 54. Each flange 56A, 56B comprises threaded openings 60A, 60B having their axes extending parallel to axis Δ and which are distributed on a cylinder of axis Δ. Flange 56B is attached to coupling device 21 via screws, not shown, which cooperate with threaded openings 60B.

Drive shaft 48 is rotatably assembled with respect to carter 54. Drive shaft 48 is for example made of steel. Preferably, the rotation axis of drive shaft 48 is confounded with axis Δ.

Each flange 56A and 56B comprises a central cylindrical portion 70A, 70B having a substantially constant thickness and extending in a peripheral cylindrical portion 72A, 72B. Central cylindrical portion 70A, 70B and peripheral cylindrical portion 72A, 72B are for example made of steel. Central cylindrical portion 70A, 70B comprises an inner cylindrical edge 74A, 74B which delimits a cylindrical opening 76A, 76B of axis Δ crossing flange 56A, 56B. Peripheral cylindrical portion 72A, 72B comprises a ring-shaped housing 78A, 78B.

Stators 77A, 77B of electric motor 42, schematically shown in FIGS. 3 and 4, are arranged in housings 78A, 78B. Preferably, electric motor 42 comprises two different stators 77A, 77B, a first stator 77A arranged in housing 78A and a second stator 77B arranged in housing 78B. Electric terminals are provided on peripheral portion 72A, 72B for the stator power supply, only terminals 79B being shown in FIG. 5.

Each housing 78A, 78B comprises a recess 80A, 80B having a pipe 82A, 82B arranged therein. As an example, pipe 82A, 82B comprises a hollow tube arranged in a spiral in recess 80A, 80B. Pipe 82A, 82B further comprises end portions 84A, 84B, 86A, 86B which cross peripheral cylindrical portion 72A, 72B and which project outside of carter 54. In operation, end portions 84A, 84B, 86A, 86B are connected to a cooling liquid supply system, not shown, enabling to circulate a cooling liquid in pipes 82A, 82B.

Central cylindrical portion 70A, 70B comprises three cylindrical openings 88A, 88B having their axes parallel to axis Δ. Only one of openings 88A, 88B is shown in FIGS. 3 and 4. Preferably, as shown in FIG. 5, the axes of openings 88A, 88B are distributed on a cylinder of axis Δ substantially at an equal distance from one another. As will be shown in further detail hereafter, openings 88A may be connected in operation to gas supply pipes. Openings 88A and 88B may further be used during maintenance operations. Each opening 88A, 88B is surrounded with a plurality of threaded openings 90A, 90B, for example, three. During the operation of quenching cell 40, threaded openings 90A may be used for the screwing of a gas supply pipe to opening 88A and threaded openings 90B may be used for the screwing of a cap, not shown.

Drive shaft 48 is connected to each flange 56A, 56B by a bearing unit 92A, 92B, enabling drive shaft 48 to rotate with respect to carter 54 around axis Δ. Bearing unit 92A comprises a bearing support 94A attached to edge 74A, for example, by screwing, and two contiguous roller bearings 96A interposed between shaft 48 and bearing support 94A. Bearing unit 92B comprises a bearing support 94B attached to edge 74B, for example, by screwing, and a roller bearing 96B interposed between shaft 48 and bearing support 94B. A ring 95 is interposed between bearing support 94A and edge 74A. The axial hold of roller bearings 96A, 96B is ensured on one side by a stop 98A, 98B provided in shaft 48 and on the other hand by a ring 100A, 100B screwed to shaft 48.

On the side of flange 56A, a cover 104 tightly closes opening 76A. On the side of flange 56B, a part 105 closes opening 76B and comprises an opening 106 for the passage of portion 50 of drive shaft 48.

Lip seals 108A, 108B enable to avoid for a material used to lubricate roller bearings 96A, 96B to penetrate into the rest of motor 42. Cover 104 may be attached to support 94A by screws, not shown, and part 105 may be attached to edge 74B by screws, not shown.

Synchronous electric motor 42 comprises a rotor 112 connected to drive shaft 48 by two intermediate parts 114. Rotor 112 is a permanent magnet rotor. The structure of rotor 112 and of the stator of synchronous electric motor 42 may correspond to the structures described in document "Axial Flux Permanent Magnet Disc Machines: A Review" by M. Aydin, S. Huang, and T. A. Lipo (Symposium on Power Electronics, Electrical Drives, Automation, and Motion (SPEEDAM) 2004, Capri, Italy, Jun. 16-18, 2004).

Rotor 112 comprises an external ring-shaped part 116. Part 116 is for example made of a composite material. Ring-shaped part 116 comprises through openings 118. A permanent magnet 120 is arranged in each opening 118. It may be a permanent magnet comprising an alloy comprising, in particular, rare earths. The poles of each magnet 120 are oriented parallel to axis Δ. The thickness of each magnet 120, measured along axis Δ, is slightly smaller than the thickness of external cylindrical part 116. In a plane perpendicular to axis Δ, each magnet 120 has the shape of a ring-shaped sector.

Each intermediate part 114 is ring-shaped. Intermediate part 114 is for example made of aluminum. Drive shaft 48 comprises a flange 122 between stops 98A, 98B. Intermediate parts 114 sandwich flange 122 and may be attached thereto, for example, by screwing. As a variation, intermediate parts 114 may be welded to flange 122. Intermediate parts 144 sandwich the inner edge of external part 116 of rotor 112 and may be attached thereto, for example, by screwing. As a variation, intermediate parts 114 may be welded to external part 116 of rotor 112.

Through openings 128 may be provided in intermediate part 114. The number of openings 128 is equal to the number of openings 88A, 88B. Advantageously, openings 128 are distributed to each be simultaneously aligned with one of openings 88A, 88B for certain angular positions of shaft 48 relative to carter 54.

To decrease risks of contamination of housings 78A, 78B by contaminants originating from the rest of motor 42, flanges 56A, 56B delimit a throat 130 for the passage of external part 116 of rotor 112. The clearance between flanges 56A, 56B in throat area 130 is preferably a few tenths of a millimeter.

In operation, gas supply pipes are connected to openings 88A and openings 88B of motor 42 are closed by covers, not shown in FIGS. 3 to 5.

When a maintenance operation should be performed on motor 42, as an example, a change of bearing units 92A, 92B, the air gap between permanent magnets 120 of rotor 112 and each stator 77A, 77B should be maintained. Indeed, if a permanent magnet 120 of rotor 112 comes into contact with one of stators 77A, 77B, this makes the electric motor impossible to use.

To achieve this, during a maintenance operation, a holding tool may be used to maintain the air gap between rotor 112 and stators 77A, 77B constant. Such a holding tool may be attached to each flange 56A, 56B and comprise pins which are introduced into openings 88A and 88B to bear against intermediate part 114. Openings 128 may ease the centering of the pins. In this case, each opening 88A may be arranged substantially in alignment with one of openings 88B, as shown in FIG. 4. Advantageously, each flange 56A, 56B comprises three openings 88A, 88B. This enables to have, for each flange 56A, 56B, three pins bearing against a surface of intermediate parts 114 of rotor 112 and to provide a stable bearing of the rotor against the pins.

When intermediate parts 114 are sandwiched between the pins, the pins are locked in position. Thus, a maintenance operation on motor 42 may be carried out, for example, the dismounting of bearings 92A, 92B, with no risk of modifying the air gap between permanent magnets 120 of rotor 112 and stators 77A, 77B.

Quenching cell 40 has several advantages.

An advantage is that the general lateral bulk, measured along axis Δ, of quenching cell 40 is decreased with respect to quenching cell 10 shown in FIG. 1. Indeed, the axial bulk of synchronous motor 42 which is, for example, approximately 200 mm, is smaller than the axial bulk of asynchronous motor 18, which may be approximately 1 m.

Another advantage is that synchronous motors 42 may provide a substantially constant drive torque, for example, at a value in the range from 500 Nm to 800 Nm, for example, approximately 600 Nm, in a significant range of rotation speeds of the drive shaft, for example in the range from a few revolutions per minute to 5,000 revolutions/min, which is adapted for the rotating of a helicon-centrifugal stirring turbine in a quenching cell.

Accordingly, the efficiency of synchronous motor 42 remains constant within a very wide range of speeds while asynchronous motors 18 have an optimum efficiency only at their normal operating point, for example, around 3,000-3,600 revolutions/min. As a result, the consumed electric power saving during an operating cycle of quenching cell 40 is in the range from 20% to 50% with respect to quenching cell 10.

To accurately determine the real conditions under which the treated parts are quenched, the real variable rotation speed of stirring elements 17 during the quenching operation should be determined. Another advantage of quenching cell 40 is that the rotation speed of stirring element 17 rotated by synchronous motor 42 may be directly determined from a synchronous motor power supply parameter, for example, the motor supply current and/or voltage. This is not true for quenching cell 10 due to the slip of asynchronous electric motor 19. For cell 10, additional means should be provided to accurately measure the real rotation speed of stirring element 17 during a quenching operation.

Another advantage is that the internal volume of each synchronous motor 42 is smaller than 15 liters, preferably smaller than 10 liters. This advantageously enables to simplify the manufacturing of synchronous motor 42 regarding pressure device regulations.

Another advantage of the embodiment where an overpressure is maintained in the internal volume of synchronous motor 42 with respect to internal volume 12 of enclosure 11 is that the risk for dusts to pass from internal volume 12 of quenching cell 40 towards the internal volume of synchronous motors 42 is decreased, or even eliminated.

Another advantage is that the use of steel flanges 56A, 56B with thick walls for motor 42 enables to use the motor despite the high pressures present therein.

Specific embodiments of the present invention have been described. Various alterations and modifications will occur to those skilled in the art. In particular, although quenching cell 40 shown in FIG. 2 comprises two synchronous motors 42, it should be clear that the quenching cell may comprise a single synchronous electric motor or more than two synchronous electric motors.

The invention claimed is:

1. A quenching cell comprising:
an enclosure containing at least one element stirring a quenching gas at a pressure greater than 0.4 MPa;
an axial flux permanent magnet synchronous electric motor rotating the at least one stirring element; and
a circuit, comprising at least a first and second valve, for supplying a quenching gas to the enclosure via the first valve and the synchronous electric motor via the second valve, wherein the supply circuit maintains, via the first and second valves and during a quenching operation, pressure in the synchronous electric motor higher than pressure in the enclosure, thereby resisting flow of dust from the enclosure to the synchronous electric motor.

2. The quenching cell of claim 1, wherein the synchronous electric motor is tight with respect to an outside of the quenching, cell, and wherein pressure in the synchronous electric motor is in a range from 10 Pa to 2,500,000 Pa.

3. The quenching cell of claim 1, wherein the synchronous electric motor comprises at least two steel flanges delimiting a volume containing at least one stator, said flanges resisting the pressure in the synchronous electric motor.

4. The quenching cell of claim 1, wherein the pressure in the synchronous electric motor is greater by at least 500 Pa than the pressure in the enclosure.

5. The quenching cell of claim 1, wherein the supply circuit maintains, during the quenching operation, the pressure in the synchronous electric motor equal to the pressure in the enclosure.

6. The quenching cell of claim 1, further comprising a sensor for sensing the pressure in the synchronous electric motor and/or a sensor for sensing a difference between the pressure in the synchronous electric motor and the pressure in the enclosure.

7. The quenching cell of claim 1, wherein the supply circuit controls the pressure in the synchronous electric motor with the pressure in the enclosure.

8. The quenching cell of claim 1, wherein the synchronous electric motor is located outside of the enclosure and comprises a drive shaft connected to the stirring element through the enclosure.

9. The quenching cell of claim 1, wherein the synchronous electric motor comprises a rotor and two stators located on either side of the rotor.

10. The quenching cell of claim 3, wherein the synchronous electric motor comprises a rotor located between the at least two flanges and connected to a drive shaft that is connected to the at least one stirring element through the enclosure, each flange comprising a first through opening for passage of the drive shaft and second through openings around the first opening.

11. The quenching cell of claim 10, wherein at least one of the second openings is connected to a pipe for supplying gas to the motor when the quenching cell is in operation.

* * * * *